Fig. 1.

INVENTOR
Edward W. Miller

Fig. 2

INVENTOR
Edward W. Miller

April 21, 1931.     E. W. MILLER     1,802,181
GEAR GENERATING MACHINE
Original Filed Jan. 19, 1928     6 Sheets-Sheet 3

Fig. 3.

INVENTOR
Edward W. Miller
by Wright, Brown, Quinby & May
attys

April 21, 1931.  E. W. MILLER  1,802,181
GEAR GENERATING MACHINE
Original Filed Jan. 19, 1928   6 Sheets-Sheet 4

INVENTOR
Edward W. Miller
by Wright, Brown, Quinby & May
Attys

Patented Apr. 21, 1931

1,802,181

UNITED STATES PATENT OFFICE

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT

GEAR GENERATING MACHINE

Application filed January 19, 1928, Serial No. 247,808. Renewed May 26, 1930.

This invention relates to machines for producing teeth of a prescribed form or outline, as to their side faces, in gears and other machine elements of a like or related nature, by means of Fellows type gear shaper cutters. Such cutters, the principles of which are explained in the patent to E. R. Fellows, No. 676,226, dated June 11, 1901, are distinguished by teeth arranged around the axis of the tool and having cutting edges at one end of the tool. They have been, and are, commonly designed and made with various forms and arrangements of teeth, and used for various purposes including the generation and forming of straight and helical spur gears, both external and internal, sprocket wheels, worms, and other machine elements.

The teeth of cutters of this type are backed off or relieved on their sides and radial extremities to provide cutting clearance so that their cutting edges only will engage the work; and they are sharpened when necessary by grinding off the end face in which the cutting edges lie. The result of many successive sharpenings of the cutter is to reduce the width of the teeth due to the backed off or inclined formation of the side faces of these teeth and the fact that each sharpening of the cutter in effect shifts the face in which the cutting edges lie a short distance back toward the end where the teeth have the least width. Thus eventually the cutter teeth become narrower than those of the machine elements with which the work piece being cut is designed to mesh. But the curvature of the cutting edges remains the same notwithstanding such reduction in the width of the cutter teeth, because the faces of the teeth are originally generated so as to make their forms the same in all intersecting planes perpendicular to the axis of the cutter.

The object of the invention is to compensate for such narrowing of the cutter teeth so that the spaces cut in the work piece will be of uniform width notwithstanding, by giving the cutter an additional movement of oscillation and without shortening the distance between the axes of the cutter and work piece; this distance being commonly spoken of as the center distance between the cutter and work. Thus it becomes possible to cut forms in the work which are truly conjugate to the tooth forms of the cutter throughout the entire useful life of the cutter, even when such tooth forms are not involute curves but are such as can generate correct curves in the work only when a given center distance is maintained.

The same general object was sought and accomplished by my prior invention disclosed in my patent of October 9, 1923, No. 1,370,229, entitled Gear Shaping Machine with Side Trimming Attachment, in which I devised means for further cutting the teeth of the work on one side by a second series of cuts after having first cut a complete series of teeth. As compared with my said prior invention, my present first object is to cut the adjacent sides of two adjacent teeth in the work with opposite edges of the same tooth of the cutter alternately, so that the cuts are equally distributed on both sides of the teeth and tooth spaces in the work and the wear is equalized on both side edges of the cutting teeth, and the work is completed, the teeth being generated to correct form and size, in a single rotation of the work after completion of the depth feed. A further object is to displace the cutting edges from the work during the return strokes of the cutter to avoid rubbing of the cutter on the work during such return strokes.

While the generic purposes and accomplishments of the invention may be carried out in various machines for turning out various classes of work, I have shown herein the specific application of the invention to a machine for generating straight spur gears by a combined rotation of cutter and work piece about parallel axes, in relatively opposite directions, and relative reciprocation of the cutter axially with alternate cutting and return strokes in opposite directions. This embodiment of the invention is described in the following specification in the understanding that it is illustrative and not limiting of the invention in its broadest aspects.

In carrying out the particular objects of this invention, I have devised means by which the cutter is given a slight angular movement at the end of each cutting stroke and a further angular movement in the same direction before the beginning of the next cutting stroke, and then a succession of similar angular movements, but in the opposite direction, before the following return and cutting strokes, respectively, these angular movements being combined with the normal rotary generating movements and taking place in constant repetition throughout the cycle of operations. Preferably, although it is not essential to do so, I provide a cutter of which the teeth are initially somewhat narrower than the prescribed width of the tooth spaces to be cut in the work, in order that before any narrowing of its teeth has taken place as the result of sharpening, there will be sufficient scope for the angular movements above mentioned, and have provided means for increasing such angular movements as the teeth become narrower, and in increments equal to the narrowing of the teeth consequent upon the sharpening. Still further, I have provided means for withdrawing the work slightly from the cutter during return or non-working strokes of the latter to avoid rubbing of the ends of the cutter teeth on the work.

For further explanation of the invention, attention is directed to the following description of the machine shown in the drawings furnished herewith, which illustrate one of the various possible embodiments of the invention.

In the drawings,—

Like reference characters designate the same parts wherever they occur in all the figures.

In a base or framework of any suitable character, there is mounted a main shaft 1, supported by bearings 2 and 3 adjacent to its ends, and carrying on its outer end a fast pulley 4 and a loose pulley 5. The shaft is rotated by a belt 6 from a prime mover or other source of power, here represented conventionally as an electric motor 7 mounted on the top of the frame structure. The shaft 1 carries a crank 8 coupled by means of a connecting rod 9 with one arm of a lever 10, pivoted on a fixed stud 11 and carrying a gear segment 12 which meshes with a series of rack teeth 13 encircling the cutter spindle 14, whereby the spindle is reciprocated in the direction of its axis.

15 represents the cutter of the same general type as shown in the patent to E. R. Fellows, No. 676,226, dated June 11, 1901, mounted on the spindle 14, and 16 represents the work piece, a gear blank, mounted on a work spindle 17 parallel to the cutter spindle. These spindles are given simultaneous but opposite, continuous, rotary movements at suitable speeds to cause the cutter and work to rotate in the same manner as a pair of intermeshing spur gears by means generally similar to those shown in my prior patent before identified, and in other prior patents, the particular form of which in the machine here shown may be traced as follows. On the main shaft 1 is a worm 18 meshing with a worm gear 19, to which is connected a spur gear 20, the latter meshing with a gear 21 on a transverse shaft 22. Said shaft carries a spiral gear 23 meshing with a complemental gear 24 on an upright shaft 25, the upper end of which carries a bevel gear 26 in mesh with a complemental bevel gear 27 on a shaft 28, to which a worm 29 is splined. The worm 29 meshes with a large worm gear 30, which is the driving wheel, commonly called the index wheel, of the cutter spindle 14, and with which the latter has a rotation transmitting engagement, which at the same time permits axial movement of the spindle, substantially as shown in my prior patent previously identified and described in the patent to E. R. Fellows, No. 1,478,472, dated December 25, 1923.

Figure 5:
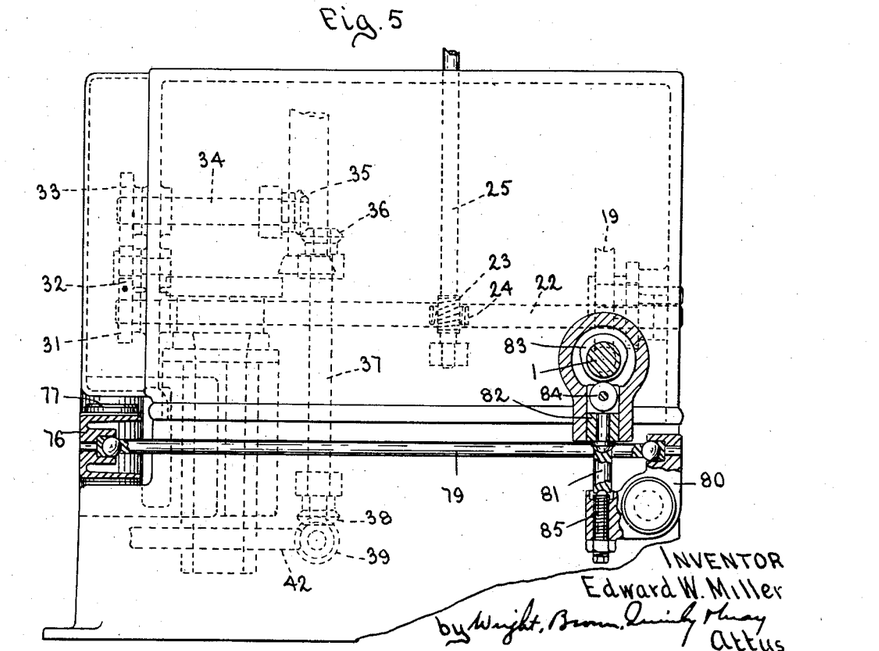
Fig. 5 is an elevation of the structure shown in Fig. 4, and in part a section on line 5—5 of Fig. 2, showing the lower part of the machine as viewed from the opposite side to that shown in Fig. 1.

The transverse shaft 22 also drives the work spindle, acting through a train of change gears 31, 32, 33, shown in Fig. 5, a shaft 34 on which the gear 33 is mounted, a bevel gear 35 on the shaft 34, a bevel gear 36 meshing with 35 and mounted on an upright shaft 37, a bevel gear 38 on shaft 37, a complemental bevel gear 39 meshing with 38 and mounted on a shaft 40, a worm 41 on shaft 40, and a worm gear 42 secured to the work spindle 17 and with which the worm 41 meshes. The worm gear 42 is the driving or index wheel of the work spindle.

It is to be understood further that the machine is equipped with depth feed mechanism for causing the cutter to be moved toward and away from the axis of the work spindle so as to cut grooves of the required depth and form teeth of the required length in the work. Such depth feed mechanism is not shown here as it forms no part of my present invention and may be the same as that shown in the above mentioned Fellows Patent 1,478,472, or those in other patents relating to the same type of machine, and because an explanation of it is not necessary to explain the new steps in which the present invention particularly consists.

The matters thus far described are essentially standard features of the type of machine referred to. The new steps of this invention consist in means for slightly oscillating the cutter about its axis in addition to the rotary generating movement given as above described, and in new means for slightly withdrawing the work from the cutter during the return or non-cutting strokes of the cutter. As stated in the introductory part of this specification, the cutter is shifted rotatably about its axis so as to cut on one side only (and on the ends) of its teeth on each cutting stroke, and alternately on opposite sides of its teeth in successive cutting strokes, and to clear the work on the non-cutting strokes. The principles of its action are shown in Figs. 10-13 inclusive, where a fragment of the cutter is shown in its relation to a fragment of the work during four successive strokes. In this illustration, the work piece shown is one which has been cut to approximate size in a previous operation and is now being finished to final form and dimensions by a finishing cutter; although the principles are unchanged when the machine is used for initially forming teeth in a circular blank.

Figure 10:
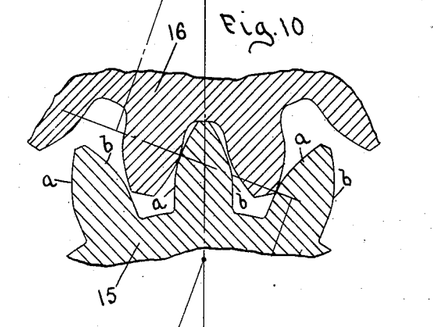
Figs. 10–13 inclusive are fragmentary sectional views of the cutter and work illustrating the successive positions of the cutter in acting on opposite sides of its teeth and of the teeth in the work piece, and in returning between cutting strokes.
Figure 11:
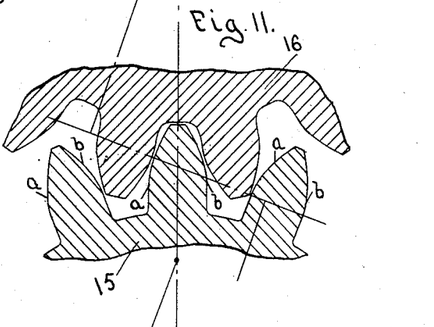
Figure 12:
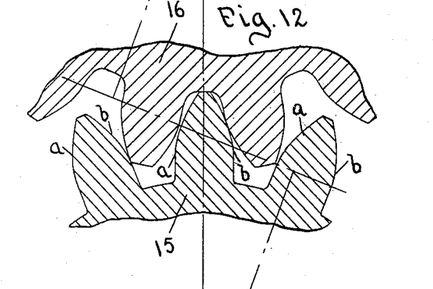
Figure 13:
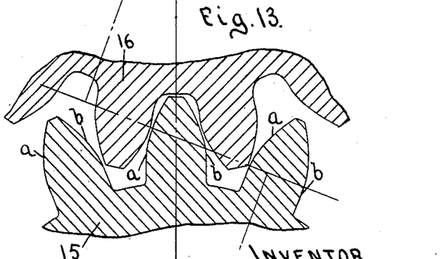

In Fig. 10 the cutter 15 is shown as set so that the lefthand cutting edges a, a of its teeth act on the righthand faces of the teeth in the work piece. This is the relationship which it assumes in the first of each recurring series of four strokes. After completing such first stroke, the cutter is given a slight angular movement to the right, substantially to the position shown in Fig. 11, where both cutting edges of each tooth clear the work, and kept in this relationship during the return stroke. Then it is given a further increment of angular movement to the right so that its right hand cutting edges b, b are in position to engage the lefthand faces of the teeth in the work piece, as shown in Fig. 12, and is held in this relation while it makes the third stroke (the second cutting stroke) of the series. Then it is moved angularly backward or in lefthand rotation, to approximately the position shown in Fig. 13 to clear both side edges of its teeth from the work and returned through the fourth (second non-cutting) stroke of the series; after which it is turned further to the left and back to the first relationship, shown in Fig. 10. It is to be understood that these last mentioned figures show simply the relationships due to the incremental rotary movements of the cutter, as through these motions were caused to take place while the generating rotation is interrupted; but actually the uniform generating movement is going on all the while so that the positions of the cutter and work piece are actually slightly different from those shown in these figures. In other words, for clearness in illustrating the new step, the continuous generating rotation has been disregarded in laying out Figs. 10-13.

For giving the incremental rotative movements to the cutter spindle, the worm 29 which drives the cutter index wheel 30 is moved endwise. I have previously stated that the worm is splined on the shaft 28. Such splined connection permits endwise movement of the worm while compelling it to rotate with the shaft. The worm is pressed upon at one end by a spring 43, Figs. 3 and 7, which acts through a flanged sleeve 44, slidable on the shaft 28, and reacts on a head 45 secured to the housing 46 in which the worm is confined. The other end of the worm is thus pressed against a sleeve or quill 47 which is movable endwise in the same housing and is prevented from rotating therein by a sliding key 48. As a practical measure anti-friction thrust bearings 49 and 50 are interposed between the ends of the worm and the adjacent sleeves, but these are not important from the point of view of the principles of the invention, and from that point of view the spring 43 presses endwise on the worm and presses the latter endwise against the abutment sleeve 47.

The sleeve 47 is engaged at the outer end by a lever 51 mounted on a pivot 52 held in lugs 53. The arm 54 of this lever is forked to straddle the protruding end of shaft 28 and carries studs 55 bearing against the abutment sleeve 47. The other arm of lever 51 carries an anti-friction roll 56 which bears on and is held against a cam 57 by the thrust of spring 43.

Figure 1:
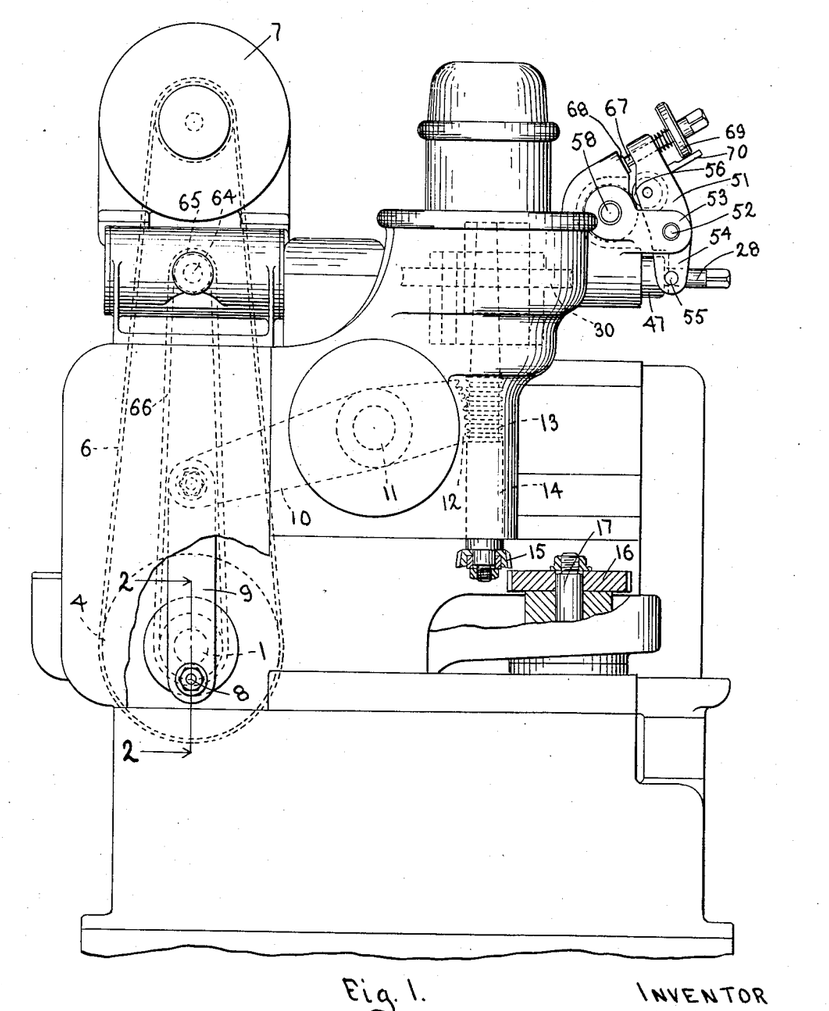
Fig. 1 is a front elevation of such machine partly broken away and shown in section.
Figure 2:
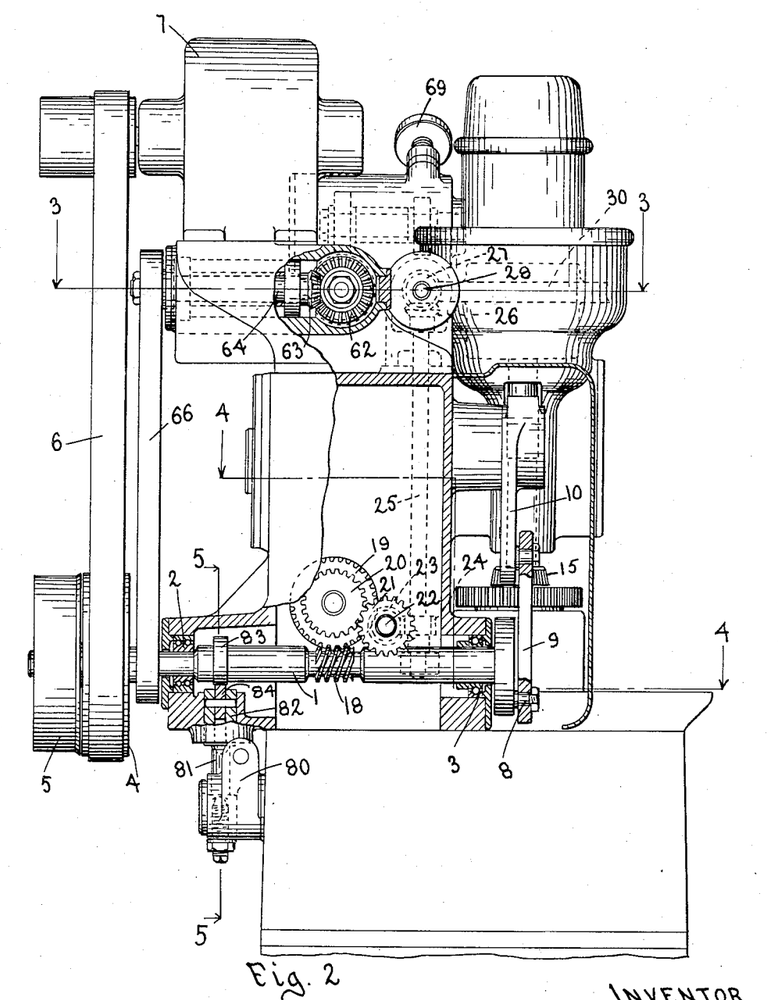
Fig. 2 is a side elevation as seen from the left of Fig. 1 with parts broken away and shown in section on the plane of line 2—2 in Fig. 1.
Figure 3:
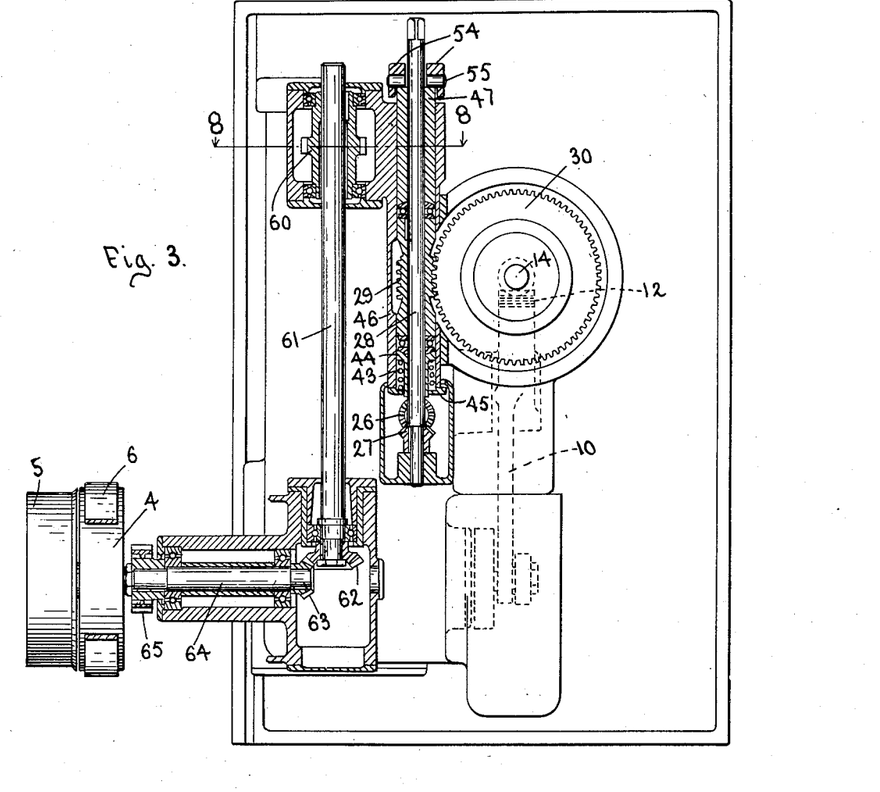
Fig. 3 is a horizontal section on line 3—3 of Fig. 2.
Figures 6, 7, 8:
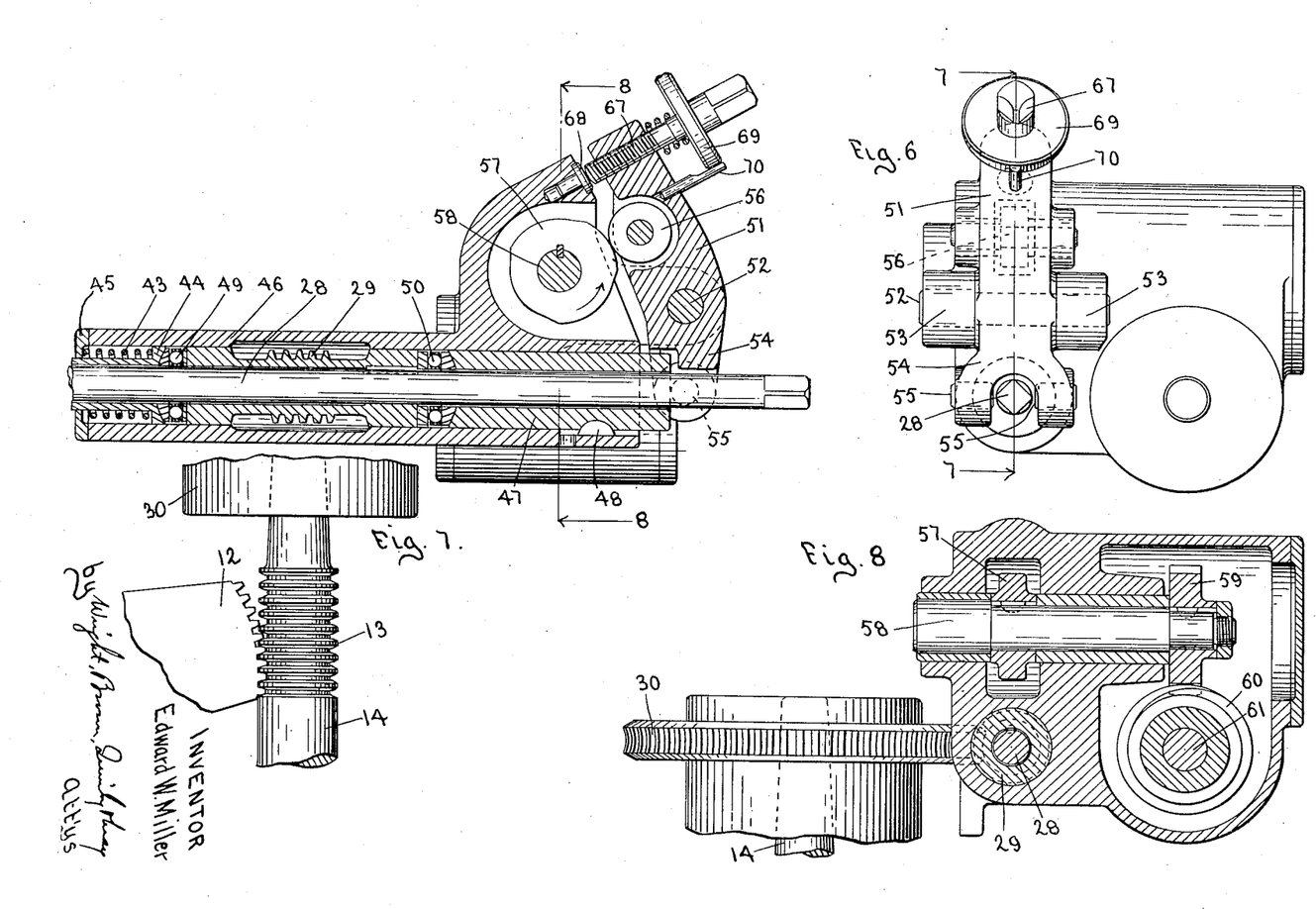
Fig. 6 is a detail elevation, as viewed from the right hand side of Fig. 1, of a part of the mechanism for giving secondary oscillative movements to the cutter.
Fig. 7 is a longitudinal section, taken on line 7—7 of Fig. 6, of the cutter oscillating mechanism.
Fig. 8 is a cross section of the cutter oscillating mechanism taken on line 8—8 of Figs. 3 and 7.
Figure 9:
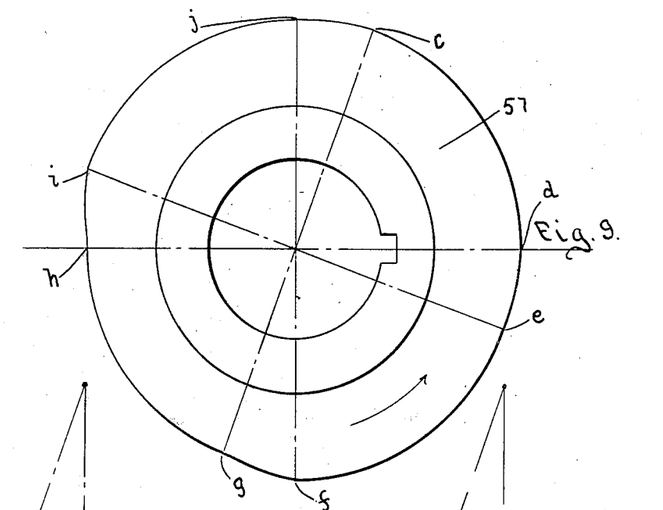
Fig. 9 is a detail elevation of the cutter oscillating cam.

Cam 57 is keyed upon a shaft 58 which carries a spiral gear or worm wheel 59 in mesh with a worm or complemental spiral gear 60 on a shaft 61, Figs. 3 and 8. Shaft 61 carries a bevel gear 62 in mesh with a bevel gear 63 on shaft 64, to which there is secured in turn a sprocket 65 driven from the main shaft 1 by a sprocket chain or belt 66. Thus the cam is given a continuous uniform rotation, always in the same direction, indicated by an arrow in Figs. 7 and 9, whenever the machine is put in action. The sprocket drive here shown is of the silent chain type, but this is an optional detail; and so far as the principles of the invention are concerned, the cam 57 may be driven by other means provided only it is properly timed with the strokes of the cutter spindle.

It will be understood that the rising surfaces of the cam 57 move the worm 29 endwise in one direction, and the receding surfaces of the cam permit movement of the worm endwise in the opposite direction under thrust of the spring 43. The cam is shown in full detail and in approximate proportions in Fig. 9. The highest part of its surface is that from the point $c$ to the point $d$, which is a circular segment and holds the worm 29 in the position causing the relationship shown in Fig. 10. From $d$ to $e$ is a slight drop, permitting the cutter to be turned to the position shown in Fig. 11. From $e$ to $f$ is a dwell which holds the cutter in the latter position during so much of the return stroke as is necessary to carry the cutter beyond the work.

From $f$ to $g$ is a drop great enough to permit bringing of the cutter into the relationship shown in Fig. 12 when the cutter teeth have been reduced by repeated sharpenings to the least width in the serviceable life of the cutter. Only a part of this drop is utilized when the cutter teeth are of greater than the minimum width, as will be presently described. From $g$ to $h$ is another dwell which permits the cutter to remain in the relationship of Fig. 12 while taking the cutting stroke with the right hand edges of its teeth; from $h$ to $i$ a rise which turns the cutter back to the relationship shown in Fig. 13; from $i$ to $j$ a dwell which holds the cutter in the latter relationship while making the next return stroke; and from $j$ to $c$ a further rise which returns the cutter to the first relationship.

An adjustable stop screw 67 is mounted in the lever 51 to engage an abutment 68 on the framework, and is provided with a graduated dial or head 69 cooperating with an index 70. This stop screw limits the approach of the roll 56 to the lowest part of the cam, and so permits any part of the relatively large drop from $f$ to $g$ to be utilized according to the thickness of the cutter teeth. As indicating the order of magnitude of the movements given by the cam, I may say, although without intending to indicate any limitation in the scope of the invention, that in one machine which I have made the cam has a radius of 1⅝" in the highest part, a drop of 23/1000" from $d$ to $e$, a drop of 102/1000" from $f$ to $g$, a rise of 115/1000" from $h$ to $i$, and a rise of 10/1000" from $j$ to $c$. Movements equal to these descents and rises are transmitted to the circumference of the index wheel 30 and diminished at the circumference of the cutter in proportion to the ratio between the cutter and index wheel.

It is readily apparent that incremental movements in either direction may be imparted to the cutter by shifting the worm in the manner described without affecting the rotary movement of the worm. As the worm rotates constantly at a uniform speed, it tends to rotate the cutter likewise at a uniform speed, but its movement endwise in one direction or the other retards or accelerates the rotation of the cutter for a brief period. I have found that a stiff helical spring at 43 is amply strong to sustain the cutter against the thrust of the cut, wherefore I prefer to use such a spring instead of a cam or other rigid means which might be used for the same purpose. I do not, however, limit myself to the use of a spring to the exclusion of other means, but reserve the right to use any other means suitable for obtaining like results.

Figure 4:
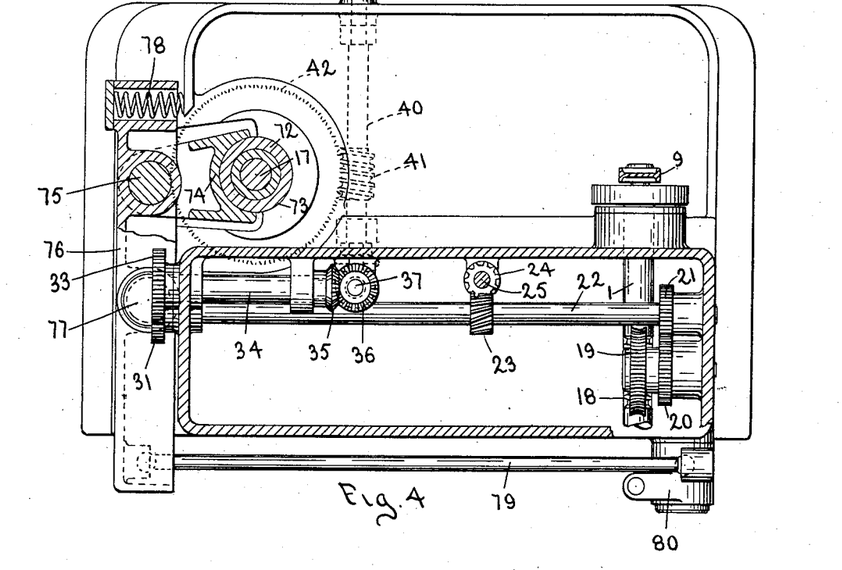
Fig. 4 is a horizontal section on line 4—4 of Fig. 2, turned so that the side which appears at the front in Fig. 2 is at the right in Fig. 4.

The incremental movement of the cutter brings the sides of its teeth clear of the work during each return stroke and serves as an extremely simple device to avoid rubbing of these parts of the cutter on the work at such times. It is desirable also to clear the ends of the cutter teeth from the bottoms of the grooves or tooth spaces in the work, and for that purpose I have devised means for slightly withdrawing the work from the cutter, which I will now describe. Such withdrawal may be very slight, for instance, 5/1000" is sufficient; hence it may be effected by merely shifting the work spindle without endangering the accuracy of mesh of the index wheel 42 on such spindle with the driving worm 41 therefor. This spindle is contained in a sleeve or quill 72 (Fig. 4) which is supported on the machine base and is adapted to bear laterally against a seat 73 in the base. The quill is screwed fast to an apron 74 which is connected by a pivot rod 75 with a lever 76, and the latter in turn is connected to the machine base by a pivot 77 about which it is adapted to swing. One arm of the lever 76 is pressed on by a spring 78 which tends to withdraw the apron together with the quill and the work spindle; and the other arm of the lever is acted upon, through a rod 79, bell crank lever 80, bar 81 and slide 82, by a cam 83 on the main shaft 1, which presses on the slide 82 through the medium of a roll 84 carried by the slide. Thus the cam, which is timed with the crank for reciprocating the cutter spindle, causes the work spindle quill to be pressed against seat 73 during the cutting strokes, and to be relieved from pressure during the return strokes of the cutter. Engagement of the rod 81 with the bell crank lever 80 is made through an adjustable screw stop 85 carried by the lever, the proper setting of which enables the cam to make its full rotation without binding while at the same time pressing the spindle carrying quill firmly against its seat. The spring 78 causes the quill to be backed off when the low part of the cam 83 passes the roll 84. It will be noted that the ends of the rods 78 and 81 have spherical bearing engagement with the adjacent parts to permit change in the angular relationship between these parts due to the rotation of the levers 76 and 80 about pivots lying in different planes.

It will be apparent from the foregoing description that the cutter is reciprocated axially, and both the cutter and work are rotated with a slow generating movement in essentially the manner familiar in machines of the gear shaper type; and that in addition to this generating movement, the cutter is given a slight increment of angular movement alternately in opposite directions, and in two steps in each of such directions, as previously described. The term "increment" or "incremental" in this description is used in a generic sense to indicate not only the additional angular movements which take place in the same direction as the generative rotation, but also those movements which take place in the opposite direction; the former being a positive increment and the latter a negative increment to the generative rotation. Whether such negative increment is equal to, or greater or less than, the generative rotation taking place in the same interval of time is unimportant, for the only important factor is that each step of the incremental movement, or at least the second step of the incremental movement in each direction, shall take place while the cutter is out of the work, and that these steps shall be sufficient to bring the opposite side of the cutter teeth into action on alternate cutting strokes and to shift the cutter teeth clear of the work in all of the non-cutting strokes.

It will be apparent further that the capacity for adjustment afforded by the low drop *f—g* of the cam which controls such incremental movement, in cooperation with the adjusting screw 67, enables the cutter to be used from the condition where its teeth are the full width of the notches to be cut in the work, until its useful life is at an end; for the adjusting screw may be set to prevent any movement whatever of the lever 51 from the position in which it is placed by the high part of the cam, and the low part of the cam may be made low enough to cause any extent of incremental movement within practical limits.

It will be understood also that without any change in principle, the new means for giving relative incremental movement between cutter and work piece may be applied to the work spindle instead of to the cutter spindle; that is, the work spindle 17 may be given the same character of incremental angular movements by endwise movements of the worm 14 effected by mechanism essentially like that herein shown and described as applied to the worm 29, or equivalent means.

By means of this invention, the machine is adjusted with the greatest ease to accurate operation with cutters of which the teeth have been made narrower by sharpening, without changing the center distance between the cutter and work, and thus to produce in the work forms which are truly conjugate to cutters which must be operated at a given center distance from the work in order to generate conjugate forms, after sharpening. This result further is accomplished with equal distribution of the cutting strokes on opposite sides of the cutter teeth and of the teeth in the work piece, and with equalization of the wear on both side edges of the cutter teeth, completing the cutting of the work piece teeth to a predetermined width in a single revolution of the work.

While the cutter teeth are likewise backed off on their ends or outer points to obtain cutting clearance in these parts also, such backing off is not a factor militating against the present object of using the cutter throughout its useful life without changing the center distance between the cutter and work. This is so because the clearance angle at the outer ends of the cutter teeth is small and such teeth are made with excess length in order to cut clearances in the gear to avoid interference with the points of the teeth of mating gears, and such excess length is so great in amount that after the teeth have been shortened by sharpening to the limit of useful life they are still long enough.

As indicated in the introductory part of this specification, the principles of incrementally rotating the cutter, or reversely the work, explained in the foregoing specification with reference to a specific embodiment, are usable with similar tools in other environments for either cutting alternately on opposite sides of the cutter teeth, or relieving the sides of the cutter teeth from contact with the work during non-cutting return strokes, singly or in conjunction. I have devised and claimed in other applications means for doing these things separately in some instances and together in others.

What I claim and desire to secure by Letters Patent is:

1. In a gear shaping machine having a gear-like planing cutter, the combination with means for giving complemental rotary generative movements about their respective axes to the cutter and work piece, and for effecting relative axial reciprocative cutting movement between them, of means for imparting additional incremental rotary movements alternately in opposite directions to one of the members constituted by the cutter and work piece.

2. In a gear shaping machine having a gear-like planing cutter, the combination with means for giving complemental rotary generative movements about their respective axes to the cutter and work piece, and for effecting relative axial cutting and return movements between them, of means for giving incremental rotary movements of two steps each, in alternately opposite directions about its axis, to one of the members constituted by the cutter and work piece.

3. In a gear shaping machine, the combination with means for giving complemental rotary generative movements to the cutter and work piece, of means for additionally rotating one of the members constituting the cutter and work piece through an incremental angle sufficient to clear the sides of the cutter teeth from the work piece after each cutting stroke, and through an additional incremental angle after each return stroke sufficient to bring the cutter and work again into cutting relationship.

4. In a gear shaping machine, the combination with means for giving complemental rotary generative movements to the cutter and work piece, of means for giving to one of the members constituting the cutter and work piece an incremental angular movement after a given cutting stroke in the direction and to the extent sufficient to clear the sides of the cutter teeth from the sides of the teeth cut in the work during the following return stroke, then giving a further increment of angular movement in the same direction to said member sufficient to bring the opposite sides of the cutter teeth into cutting relationship with the work during the next cutting stroke, then giving an increment of angular movement in the opposite direction to said member sufficient to clear the sides of the cutter teeth of the work during the next return stroke, and finally giving a further increment of rotary movement in the last mentioned direction to said member prior to the next following cutting stroke sufficient to restore the original cutting relationship; all in repeated sequence.

5. In a gear shaping machine, a cutter spindle, a work spindle, means for reciprocating one of said spindles endwise, means for rotating said spindles simultaneously and oppositely to one another, and means for giving an incremental angular movement to one of said spindles after each recipreating movement of the endwise movable spindle.

6. In a gear shaping machine, a cutter spindle, a work spindle, means for reciprocating one of said spindles endwise, means for rotating said spindles simultaneously and oppositely to one another, and means for incrementally rotating one of said spindles through a small angle in one direction at the end of one reciprocating movement of the endwise movable spindle, further in the same direction at the end of the next reciprocation of said spindle, then in the opposite direction at the end of the third reciprocation, and further in the last named direction at the end of the fourth reciprocation, in repeated sequence.

7. In a gear shaping machine, cutter and work spindles parallel to one another, and means for rotating said spindles simultaneously in relatively opposite directions, the said means for so rotating one of said spindles being a worm gear engaged with the spindle, and a worm meshing with said gear, combined with means for moving said worm endwise through a limited distance in alternately opposite directions in the course of rotation thereof.

8. In a gear shaping machine, cutter and work spindles parallel to one another, and means for rotating said spindles simultaneously in relatively opposite directions, the said means for so rotating one of said spindles being a worm gear engaged with the spindle, and a worm meshing with said gear, combined with means for moving said worm endwise through two steps of limited extent first in one direction and then in the opposite direction.

9. In a gear shaping machine, a spindle, an index gear wheel connected to said spindle for imparting rotation thereto, a worm in mesh with the wheel for rotating the latter, a drive shaft for said worm with respect to which the worm is movable endwise, means for applying force to said worm tending to move it endwise in one direction, and a cam organized to exert resistance and force to the worm in the opposite direction.

10. In a gear shaping machine, a spindle, an index wheel engaged with said spindle for imparting rotation thereto, a rotatable driving worm in mesh with said wheel, a drive shaft for said worm with respect to which the latter is movable endwise, and a cam arranged and engaged with said worm to cause endwise movement thereof in alternately opposite directions.

11. In a gear shaping machine, a spindle, an index gear wheel engaged with said spindle for rotating it, a driving worm in mesh with said wheel, a shaft to which said worm is splined with provision for relative endwise movement, and cam controlled means for moving said worm endwise alternately in opposite directions through a limited distance and in a plurality of steps in each direction.

12. In a gear shaping machine, a rotatable spindle, an index gear wheel coupled thereto for rotating it, a driving worm in mesh with said gear wheel, a driving shaft for the worm on which the latter is splined for endwise movement, a cam, and a lever between said cam and worm arranged to cause endwise movement in opposite directions to the worm, said cam being provided with receding surfaces in a plurality of steps and rising surfaces in a plurality of steps.

13. In a gear shaping machine, a rotatable spindle, an index gear wheel coupled thereto for rotating it, a driving worm in mesh with said gear wheel, a driving shaft for the worm on which the latter is splined for endwise movement, a cam, and a lever between said cam and worm arranged to cause endwise movement in opposite directions to the worm, said cam being formed in succession with a high dwell, a receding surface, an intermediate dwell, a second receding surface, a low dwell, a rising surface, a second intermediate dwell, and a further rising surface, whereby the worm is caused to move endwise first in one direction and then in the opposite direction with two steps of movement in each direction.

14. In a gear shaping machine, a rotatable spindle, an index gear wheel coupled thereto for rotating it, a driving worm in mesh with said gear wheel, a driving shaft for the worm on which the latter is splined for endwise movement, a cam, and a lever between said cam and worm arranged to cause endwise movement in opposite directions to the worm, said cam having high and low dwells with receding and rising surfaces between them, combined with means for exerting constant pressure endwise on the worm in the direction tending to maintain the lever in contact with the cam, and adjustable means for limiting the movement of the lever toward the low dwell of the cam.

15. In a shaping machine having a gear shaper planing cutter with teeth of less width than the spaces to be cut in the work, the combination with means for effecting reciprocative relative cutting travel between the cutter and work and simultaneous generating rotation of both cutter and work, of means for oscillating the cutter, between successive cutting strokes, in alternately opposite directions and to an extent equal to the difference between the width of its teeth and the width of the spaces to be cut in the work.

16. In a shaping machine having a gear shaper planing cutter with teeth of less width than the tooth spaces to be cut in the work, means for effecting relative reciprocative cutting travel between the cutter and work and rotative generating travel of both cutter and work, means for effecting incremental rotation between the cutter and work in alternately opposite directions between successive cutting strokes equal to the difference between the width of said teeth and tooth spaces, said means being organized to place and hold the cutter teeth in intermediate position during the return strokes.

17. In a shaping machine having a gear shaper cutter with teeth narrower than the tooth spaces to be cut in the work and means for effecting reciprocative cutting travel and rotative generating travel between the cutter and work, means for effecting an incremental relative rotation between the cutter and work sufficient to clear the sides of the cutter teeth from the work after each cutting stroke, and means for increasing the center distance between the cutter and work during the non-cutting strokes.

18. In a gear generating machine of the type set forth having a cutter spindle and a work spindle, means for increasing the center distance between said spindles prior to the non-cutting strokes and restoring the prescribed center distance prior to the cutting strokes, comprising a movable holder for one of said spindles, a lateral seat for locating said holder during the cutting strokes, a lever, a power transmitting shaft, a cam carried by said shaft, a cam follower and intermediate transmission mechanism between said cam and lever arranged to impart movement to said lever in one direction about its axis, and a spring acting on the lever tending to move it in the opposite direction, said lever being operatively engaged with said spindle holder to hold the latter against its seat when moved in one direction and to permit withdrawal of the holder from said seat with movement of the lever in the opposite direction.

19. In a shaping machine having a gear shaper planing cutter with teeth of less width than the spaces to be cut in the work, the combination with means for effecting relative cutting travel between the cutter and work, of means for oscillating the cutter about its axis in alternately opposite directions between successive cutting actions in the same space.

20. In a shaping machine having a gear shaper planing cutter with teeth of less width than the spaces to be cut in the work, the combination with means for effecting relative cutting travel between the cutter and work, of means for oscillating the cutter about its axis in alternately opposite directions through a distance equal to the difference between the width of the spaces to be cut in the work and the width of its teeth.

21. In a shaping machine having a gear shaper planing cutter with teeth of less width than the spaces to be cut in the work, the combination with means for effecting relative cutting travel between the cutter and work repeatedly in the same spaces of the work, of means for effecting a relative lateral movement alternately in opposite directions between the cutter and work through distances sufficient to cause cutting action first on one side and then on the other side of the cutter teeth repeatedly in the course of cutting each space.

22. In a shaping machine having a gear shaper planing cutter with teeth of less width than the spaces to be cut in the work, the combination with means for effecting reciprocative relative cutting travel, and angular relative feeding travel, between the cutter and work, of means for oscillating the cutter between successive cutting and return strokes, through distances less than the difference between the width of the spaces to be cut in the work and the width of the cutter teeth.

23. In a shaping machine having a gear shaper planing cutter with teeth of less width than the spaces to be cut in the work, the combination with means for effecting relative reciprocating cutting and return strokes between the cutter and work, and simultaneous progressive feeding travel, of means for giving a limited oscillation to the cutter after each cutting stroke to relieve the edges of its teeth from the work during the following non-cutting stroke.

24. In a shaping machine having a gear shaper planing cutter with teeth of less width than the spaces to be cut in the work, the combination with means for rotating the cutter and work progressively about their respective axes, of means for effecting incremental oscillation of the cutter about its own axis from time to time.

25. In a shaping machine having a gear shaper planing cutter with teeth of less width than the spaces to be cut in the work, the combination with means for progressively rotating the cutter about its axis in the same direction, of means for incrementally rotating the cutter from time to time about the same axis in opposite directions.

26. In a machine of the character described, a cutter holder, a work holder, means for effecting relative axial reciprocation between said holders for cutting, means for giving one of said holders an independent angular movement for effecting relative cutting feed, and means for giving one of the holders a limited angular movement about an axis substantially parallel to the direction of said reciprocating movement, alternately in opposite directions and between successive reciprocative strokes to relieve the work and cutter from rubbing contact during the non-cutting strokes.

27. In a machine of the character described, a cutter holder, a work holder, means for effecting relative axial reciprocating movement between said holders for cutting, a lever oscillative about an axis parallel to the line of said cutting movement, to which one of said holders is connected, and means for giving said lever a limited angular movement after each of said reciprocating movements whereby to relieve the cutter and work of rubbing contact during non-cutting strokes and restore them to cutting relationship prior to the cutting strokes.

28. In a machine of the character described, a work holder, a cutter holder, means for effecting relative reciprocating movements between said holders for cutting, a lever movable angularly about an axis parallel to the direction of said reciprocating movement to which one of the holders is connected for movement toward and away from the other holder by oscillations of the lever, and means for oscillating said lever in timed relation to the strokes of said reciprocating movement.

In testimony whereof I have affixed my signature.

EDWARD W. MILLER.